(12) United States Patent
Saremi

(10) Patent No.: US 9,118,630 B2
(45) Date of Patent: Aug. 25, 2015

(54) CLIENT PROXY FOR KEY EXCHANGE IN HTTP LIVE STREAMING

(71) Applicant: Thomas Jefferson Saremi, Mississauga (CA)

(72) Inventor: Thomas Jefferson Saremi, Mississauga (CA)

(73) Assignee: Morega Systems Inc., Toronto (CA)

( * ) Notice: Subject to any disclaimer, the term of this patent is extended or adjusted under 35 U.S.C. 154(b) by 34 days.

(21) Appl. No.: 13/893,968

(22) Filed: May 14, 2013

(65) Prior Publication Data
US 2014/0344575 A1 Nov. 20, 2014

(51) Int. Cl.
*H04L 29/06* (2006.01)
*G06F 21/62* (2013.01)
*H04L 29/08* (2006.01)

(52) U.S. Cl.
CPC ............ *H04L 63/0428* (2013.01); *G06F 21/62* (2013.01); *H04L 63/061* (2013.01); *H04L 67/2809* (2013.01)

(58) Field of Classification Search
None
See application file for complete search history.

(56) References Cited

U.S. PATENT DOCUMENTS

| | | | | |
|---|---|---|---|---|
| 8,767,961 | B2 * | 7/2014 | Chen et al. | 380/210 |
| 8,813,246 | B2 * | 8/2014 | Hierro et al. | 726/27 |
| 2012/0185693 | A1 * | 7/2012 | Chen et al. | 713/168 |
| 2012/0278833 | A1 | 11/2012 | Tam | |
| 2012/0284802 | A1 * | 11/2012 | Hierro et al. | 726/27 |
| 2013/0136264 | A1 * | 5/2013 | Kim et al. | 380/278 |

OTHER PUBLICATIONS

Schneier, Applied Cryptography, 1996, John Wiley & Sons, pp. 270-278, 319-325, 397-398.*
Stallings, Cryptography and Network Security—Principles and Practice, 2003, Prectice Hall, pp. 531-548.*
U.S. Appl. No. 13/893,960, filed May 14, 2013 35 pgs.
U.S. Appl. No. 13/893,981, filed May 14, 2013 24 pgs.
U.S. Appl. No. 13/741,668, filed Jan. 15, 2013 44 pgs.
U.S. Appl. No. 13/732,473, filed Jan. 2, 2013 32 pgs.
U.S. Appl. No. 13/682,934, filed Nov. 21, 2012 39 pgs.
Pantos, R. and May, W., "HTTP Live Streaming", Internet Engineering Task Force, Oct. 15, 2012, 38 pages, IETF Trust.
HTTP Live Streaming Overview, Media Guide, Apple, Inc., Apr. 1, 2011, 36 pgs.
"Using Apple HLS Streaming," JW Player, Apr. 14, 2013, Long Tail Video.

* cited by examiner

*Primary Examiner* — Minh Dinh

(57) ABSTRACT

A client device includes a media player and a client proxy. The client proxy is to receive a first version of a playlist from a media server, the first version of the playlist including a first identifier of a cipher key to be used to decrypt at least one segment listed in the playlist. The first identifier identifies a location at the media server. The client proxy is to conduct a key exchange with the media server using the first location identifier to obtain the cipher key and store the cipher key at a local storage location at the client device. The client proxy also is to provide a second version of the playlist to the media player, the second version of the playlist including a second identifier of the cipher key, and the second identifier identifying the local storage location at the client device.

8 Claims, 7 Drawing Sheets

CLIENT PROXY FOR KEY EXCHANGE IN HTTP LIVE STREAMING

FIELD OF THE DISCLOSURE

The present disclosure relates generally to distribution of multimedia data over a network and more particularly to segmented streaming of multimedia data between a server and a client.

BACKGROUND

The HyperText Transfer Protocol (HTTP) Live Streaming (HLS) standard provides for the segmentation of a multimedia program by a media server into a sequence of relatively small segments. The server may provide to a client device a playlist, or "index file," listing separate identifiers (typically uniform resource identifiers (URIs)) for each these segments. Using this playlist and the segment URIs listed therein, the client device then may initiate downloading of each segment in order using standard HTTP messaging. By utilizing standard HTTP protocols in conjunction with other widely-adopted protocols, such as HyperText Markup Language (HTML) standards, HLS enables conventional web servers to effectively distribute multimedia programs to a wide variety of client devices.

In order to prevent unauthorized access to the multimedia content transmitted from the media server to the client device, HLS can employ an encryption scheme whereby the segments are encrypted in accordance with, for example, a 128-bit Advanced Encryption Standard (AES-128) scheme. In this approach, a uniform resource identifier (URI) of the cipher key to be used to decrypt one or more segments of a playlist is listed in the playlist itself. This URI points to a location at the media server or other external entity. Thus, to obtain the cipher key, the client device issues a standard HTTP request to the media server using the URL of the cipher key as listed in the playlist. The media server locally accesses the cipher key and replies to the key request by sending an HTTP response to the client device with the cipher key in plain text. As such, there is little to prevent an unauthorized party from accessing the unprotected cipher key from this conventional key exchange in HLS and then decrypting the corresponding multimedia content.

BRIEF DESCRIPTIONS OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
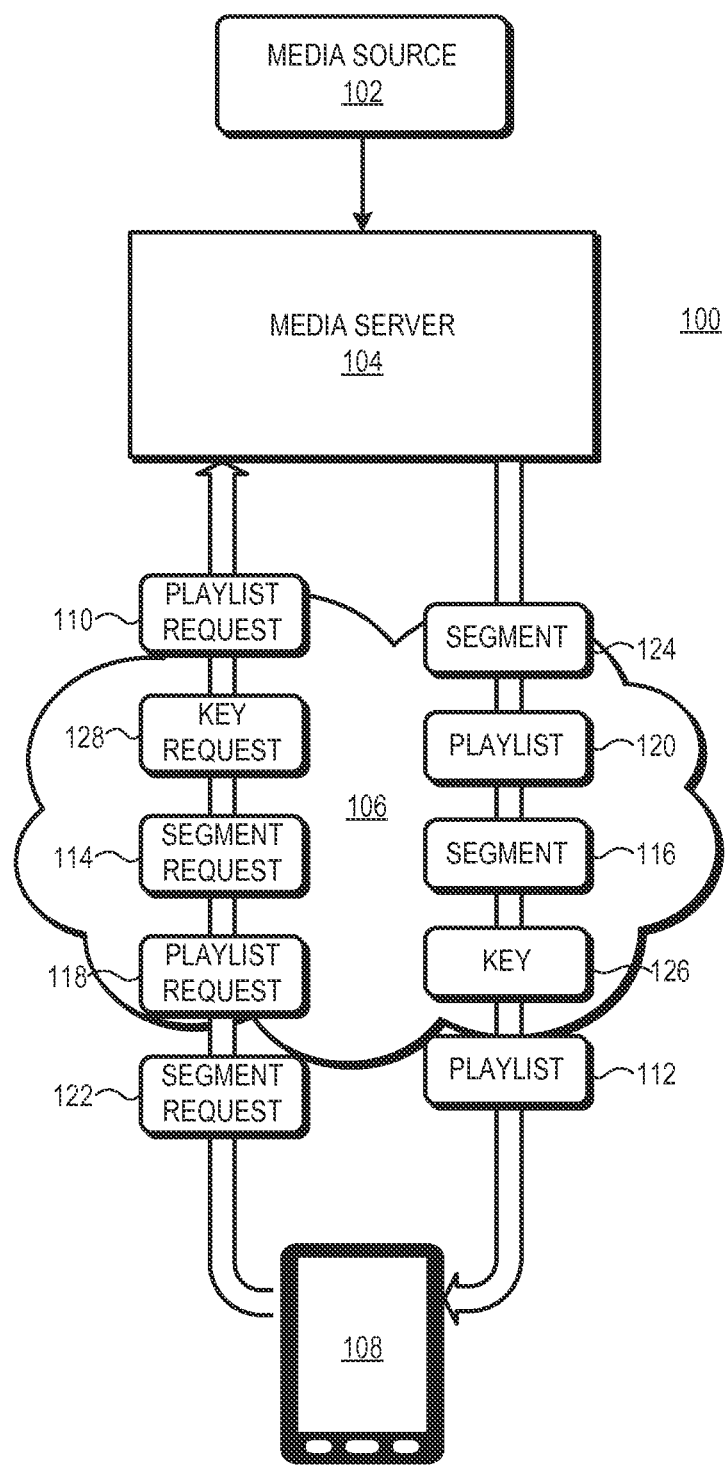
FIG. 1 is a block diagram illustrating an HLS-based multimedia distribution system in accordance with some embodiments.

The following description is intended to convey a thorough understanding of the present disclosure by providing a number of specific embodiments and details involving servers employing HTTP Live Streaming (HLS) or other multimedia segmentation standard. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosed techniques for their intended purposes and benefits in any number of alternative embodiments, depending upon specific design and other needs. Moreover, unless otherwise noted, the figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

FIGS. 1-7 illustrate example techniques for streaming of multimedia programs from a server to one or more client devices based on a Hypertext Transport Protocol (HTTP) Live Streaming (HLS) standard or other standard that employs playback-duration-based segmentation and transport protocol-based downloading of the resulting segments. In some embodiments, a client device employs a client proxy (also referred to herein as an "HLS proxy") that serves as an interface between a media server that streams multimedia programs in accordance with the HLS standard and a media player that receives and processes segmented multimedia streams for playback to an end user in accordance with the HLS standard. The HLS proxy translates communications between the media server and the media player such that the HLS proxy appears as an HLS server to the media player and appears as an HLS client to the media server.

In acting as an intermediary between the media server and the media player, the HLS proxy is able to mitigate certain vulnerabilities manifested in conventional HLS implementations. To illustrate, in some embodiments, the HLS proxy assumes responsibility for the adaptive bitrate playlist selection process, which conventionally is handled by the media player. In this approach, the HLS proxy provides a static playlist of segments to the media player for a multimedia program to be processed by the media player. Here, reference to the term "static" in "static playlist" refers to the fact that the segment location identifier, which typically is a uniform resource identifier (URI), for a given segment does not change in the playlist, and does not imply that the segments listed in the playlist do not change (for example, for a live broadcast program, certain older segments may drop out of the static playlist while newly available segments are added as the live broadcast progresses—that is, the static playlist can include a "sliding window" playlist). The HLS proxy, in turn, maintains a local variant playlist thr the multimedia program and monitors the network interface of the client interface for changes in available bandwidth, jitter, or other indicators of network performance. In the event that a change in network performance supports a change to a different encoding of the multimedia program (e.g., one with a bit rate suitable for the current available bandwidth), the HLS proxy accesses the variant playlist for the identified encoding from the media server and then replaces or otherwise updates its local variant playlist with the newly accessed variant playlist.

The media player uses the static playlist to request segments for the multimedia program. When the HLS proxy receives a segment request from the media player, the HLS proxy matches the requested segment with a corresponding segment listed in the local variant playlist maintained by the HLS proxy. That is, the HLS proxy identifies the segment listed in the local variant playlist that represents the same multimedia content associated with the segment identified in the segment request from the media player. This match may be obtained by comparing the URI of the requested segment from the static playlist with the URIs of the segments listed in the local variant playlist. The HLS proxy then accesses the identified segment from the local variant playlist (this segment being referred to herein as the "variant segment") and provides this accessed segment to the media player as though it were the segment originally requested by the media player from the static playlist (this segment being referred to herein as the "static segment"). Thus, because the media player is presented with a single playlist for a requested multimedia program, while the HLS proxy manages the adaptive bitrate selection of variant playlists for the multimedia program and handles the actual requesting of segments from the media server in a manner transparent to the media player, changes in network performance will not trigger the media player to flush its buffers and thus make repeat requests for the same segment at different bitrates. As such, the unnecessary use of media server resources or playback issues at the media player that otherwise arise from such repeat requests for segments can be minimized or avoided.

Another vulnerability manifested in conventional HLS implementations that may be mitigated by the use of the HLS proxy includes the susceptibility to unauthorized access to cipher keys used to encrypt segments found in conventional HLS-based key exchange schemes. As noted above, the cipher key used by a media server to encrypt segments typically is listed in the playlist provided for the segments, and the conventional key exchange scheme used by the client device to obtain the cipher key is to submit an HTTP request from the client device to the media server using the media server URI of the cipher key listed in the playlist, in response to which the media server transmits the cipher key in plaintext to the client device as an HTTP response. As such, the plaintext cipher key is susceptible to being intercepted during the transfer of the cipher key from the media server to the client device. In some embodiments, the HLS proxy mitigates this susceptibility by replacing the standard-type key exchange scheme between the client device and the media server with a custom-type key exchange between the client device and the media server. This custom-type key exchange may incorporate certain protective features, such as encryption or use of a proprietary transfer protocol, to effect a transfer of a cipher key in a manner more secure than the standard HTTP-based transfer promulgated by HLS. The custom-type key exchange may differ from the standard-type key exchange by protocol used (e.g., using the file transfer protocol (FTP) or a proprietary transfer protocol in place of the standard HTTP protocol), by protection mechanisms employed to encrypt the cipher key (e.g., using AES encryption or one-time-pad encryption rather than the asymmetric encryption employed in secured socket layer (SSL) techniques employed for HTTPS communications), and the like. Once at the client device, the HLS proxy unprotects the cipher key and makes it available to the media player in plaintext form though, for example, a standard HTTP-based key exchange process (using HTTP or HTTPS).

As described below, the media server or other entity can trigger the HLS proxy to initiate the protected key exchange by including some form of a trigger indicator in the playlist. To illustrate, HLS provides for the specification of the location of the cipher key at the media server using a URI with a standard URI scheme (e.g., "http:"). Accordingly, in some embodiments, the media server can instead use a custom scheme in the cipher key URI in the playlist provided from the media server. The HLS proxy, upon detecting the presence of this custom scheme in the cipher key URI, initiates the custom key exchange scheme described herein, rather than the default standard key exchange scheme. Other indicators may be used, such as custom HTML tags and the like. In some embodiments, the HLS proxy acts as a though it were the media server from the perspective of the media player and thus transfers the cipher key to the media player via the standard unprotected key exchange scheme the HLS-enabled media player expects. As such, the HLS proxy can secure the cipher key in its transit from the media server to the client device in a manner that is transparent to the media player, and thus allowing the implementation of HLS-compliant media players at a client device without customization or other modification.

For ease of illustration, embodiments of the present disclosure are described in the example context of a web server using an HLS standard to stream a multimedia program to a client device. In accordance with an HLS standard, the web server represents the multimedia program to a client device as a playlist or other index of segments, and whereby the client device employs HTTP to sequentially access segments identified in the playlist and decode the accessed segments at the client device for playback to a viewer. However, the techniques described herein are not limited to a HLS standard or an HTTP standard, but instead may be employed for systems using any of a variety of similar multimedia streaming standards that employ segmentation with corresponding playlists, or index files, or systems using any of a variety of transport protocol standards that can implement the transfer of segments using such playlists. Moreover, any reference made herein to "multimedia" or "media" may refer to video, audio, or the combination of video and audio, unless otherwise noted. Any reference made herein to HTFP also refers to secure HTTP (HTTPS), unless otherwise noted.

FIG. 1 illustrates an example multimedia distribution system 100 employing HLS-based multimedia streaming in accordance with some embodiments. In the depicted example, the multimedia distribution system 100 includes a media source 102, a media server 104, a network 1106, and one or more client devices, such as client device 108. The media source 102 can comprise any of a variety of sources or feeds of live or pre-recorded multimedia programs, such as a broadcast cable network, a broadcast satellite network, a broadcast television network, an Internet Protocol (IP) television distribution system, a broadcast mobile network, a multimedia conferencing service or other source of multimedia. Examples of pre-recorded media sources include multimedia-on-demand (VOD) sources such as an Internet-based media source, such as YouTube™, Hulu™, Nefflix™, a cable or IP television multimedia on demand network, a digital multimedia recorder, a multimedia camera, a personal computer or other source of stored multimedia. Examples of live multimedia programs include broadcast television network programs, broadcast cable network programs, and the like. The media server 104 comprises a web-based server that serves multimedia programs as streams of segments to the client device 108 via the network 106, which can include the Internet, a wired or wireless local area network (LAN), a wired or wireless wide area network (WAN), and the like, or a combination of such networks. The client device 108 can comprise any of a variety of HLS-enabled client devices, such as a computing-enabled cellular phone (e.g., "smartphone"), tablet computer, notebook computer, personal computer, set-top box, gaming console, Internet-enabled television, and the like.

As a general overview, the media server 104 operates to encode a live or pre-recorded multimedia program from the media source 1102 and stream the resulting encoded multimedia program to the client device 108. As part of this process, the media server 104 implements an HLS standard so as to enable streaming of the encoded multimedia program as a sequence of Motion Pictures Experts Group-2 (MPEG2) transport stream segments, each of which may be separately downloaded from the media server 104 by a client device using standard HTTP request and response messaging. To facilitate this process, the media server 104 generates one or more playlists (e.g., index files), each comprising data listing a set of location identifiers (e.g., URIs) of one or more segments for the multimedia program that are available to be downloaded from the media server 104. As the media server 104 may be able to generate multiple encoding versions of the same multimedia program (that is, versions with different bitrates), the media server 104 may provide a master playlist that lists multiple variant playlists, with each variant playlist associated with a corresponding bitrate/encoding and including a listing of URIs for segments encoded at the corresponding bitrate/encoding. Table 1 below illustrates a simple example of a master playlist with three variant playlists. As specified by the HLS standard, a playlist is designated as a file with a file extension "m3u8".

TABLE 1

Example Master Playlist

| (1) | #EXTM3U |
| (2) | #EXT-X-STREAM-INF:PROGRAM-ID = 1, BANDWIDTH = 4000000 |
| (3) | http://server/hi.m3u8 |
| (4) | #EXT-X-STREAM-INF:PROGRAM-ID = 1, BANDWIDTH = 2000000 |
| (5) | http://server/mid.m3u8 |
| (6) | #EXT-X-STREAM-INF:PROGRAM-ID = 1, BANDWIDTH = 1000000 |
| (7) | http://server/low.m3u8 |
| (8) | #EXT-X-ENDLIST |

Lines (2) and (3) specify that a variant playlist "hi.m3u8" suitable for a bandwidth of 4 megabits-per-second (Mbps) is available at the media server 104 at the location "//server/hi.m3u8". Lines (4) and (5) specify that a variant playlist "mid.m3u8" suitable for a bandwidth of 2. Mbps is available at the media server 104 at the location "//server/mid.m3u8," Lines (6) and (7) specify that a variant playlist "low.m.3u8" suitable for a bandwidth of 1 Mbps is available at the media server 104 at the location "//server/low.m3u8."

Thus, if the client device 108 determines that its available bandwidth is around 3 Mbps, the client device 108 would then select the variant playlist "mid.m3u8" and issue a playlist request 110 for this variant playlist in the form of an HTTP request directed to the URI "//server/mid.m3u8." In response to the HTTP request, the media server 104 accesses the playlist "mid.m3u8" and returns this playlist as playlist 112 to the client device 108 as a HTTP response message. Table 2 below illustrates a simple example of the playlist 112 having three encrypted MPEG2 transport stream segments (denoted as "segment1.ts", "segment2.ts", and "segment3.ts") encoded at the bitrate of 2 Mbps:

TABLE 2

Example HLS Playlist 112

| (1) | #EXTM3U |
| (2) | #EXT-X-VERSION:3 |
| (3) | #EXT-X-TARGETDURATION:10 |
| (4) | #EXTINF:10,http://server/segment1.ts?bitrate = 2000000 |
| (5) | #EXTINF:10,http://server/segment2.ts?bitrate = 2000000 |
| (6) | #EXTINF:10,http://server/segment3.ts?bitrate = 2000000 |
| (7) | #EXT-X-ENDLIST |

The listing of each segment in the playlist 112 takes the form of: "#EXTINF:<advertised playback duration in seconds>, <URI of transport stream segment>?bitrate=<targeted bitrate>". Thus, line (4), "#EXTINF: 10, http://server/segment1.ts?2000000" specifies the first segment in the playlist 112 has an advertised playback duration of 10 seconds, can be downloaded or otherwise accessed from the media server 104 via an HTFP request to the location "//server/segment1.ts" and is encoded at a bitrate of 2 Mbps. Likewise, line (5), "#EXTINF: 10, http://server/segment2.ts?2000000" specifies the second segment in the playlist 112 has an advertised playback duration of 10 seconds, can be downloaded or otherwise accessed from the media server 104 via an HTTP request to the location "sersTersegment2.ts," and is encoded/will be encoded at a bitrate of 2 Mhps. Similarly, line (6), "#EXTINF: 10, http://server/segment3.ts" specifies the third segment in the playlist 112 has an advertised playback duration of 10 seconds, can be downloaded or otherwise accessed from the media server 104 via an HTTP request to the location "//server/segment3.ts," and is encodedwill be encoded at a bitrate of 2 Mbps.

The process of serving the segmented multimedia program to the client device 108 is initiated when an end user interacts with the media player (e.g., a software multimedia player application) at the client device 108 to indicate the user's desire to view a multimedia program. The client device 108 initiates a request for the master playlist associated with the multimedia program identified by the viewer. To illustrate, the media player may include a web browser compliant with the HTML5 standard, and the user may navigate the web browser to a web page with a <multimedia> tag linked to the multimedia program. Table 3 illustrates a simple example of HTML code in a web page that initiates the sequential download and playback of a segmented multimedia program:

TABLE 3

Example HTML5 code

| (1) | <html> |
| (2) | <body> |
| (3) | <multimedia |
| (4) | src="http://server/master_playlist.m3u8" |
| (5) | height="300" width="400" |
| (6) | > |
| (7) | </multimedia> |
| (8) | </body> |
| (9) | </html> |

The <multimedia> tag at lines (3)-(7) of the HTML5 code signals a web browser (one example of a media player) to access the master playlist located at the URI "//server/master_playlist.m3u8" using a playlist request in preparation for multimedia playback of the multimedia program represented by the playlist. Using this URI, a client proxy (such as the HLS proxy described below with reference to FIGS. 3-7) operates to access the playlist using a playlist request (in the form of an HTTP GET request to the identified URI). Upon receipt of the master playlist, the client proxy determines the current network heuristics of the connection between the client device 108 and the media server 104 and selects a variant playlist 112 compatible with the network performance indicated by the current network heuristics. The client proxy then submits the playlist request 110 for the variant playlist 112 to obtain the variant playlist 112

Upon receipt of the variant playlist 112, the client proxy and the web browser at the client device 108 cooperate to sequence through segments indexed by the playlist 112. To illustrate, upon processing line (4) of the variant playlist 112 represented by Table 2, the client device 108 issues a segment request 114 (in the form of an HTTP GET request to the specified URI, "//server/segment1.ts"), in response to which the media server 104 transmits the requested first segment 116 ("segment1.ts") to the client device 108 as one or more HTTP headers and a HTTP response body containing transport stream packets comprising the first segment 116. The client proxy forwards the first segment 116 to the web browser, which decodes the segment (and decrypts it if received in encrypted form, as described below) and provides the resulting multimedia content for playback via a multimedia player embedded in, or associated with, the web browser.

In the illustrated example, after requesting the first segment 116 the client proxy determines that the network performance of the link between the client device 108 and the media server 104 has changed sufficiently to necessitate an adaptive bitrate switch to a variant playlist in the master playlist that is for a bitrate version compatible with the new link conditions. For example, the link conditions may have deteriorated to the point that only the 1 Mbps bitrate is suitable. Accordingly, the client proxy issues a playlist request 118 to the media server 104 for the variant playlist "low.m3u8" (in the form of an HTTP GET request to the specified URL "//server/low.m3u8"). The media server 104 responds by sending the requested variant playlist as variant playlist 120. Upon receipt of the variant playlist 120, the client proxy and the web browser cooperate to sequence through segments indexed by the variant playlist 120 starting from the segment following the last segment requested using the previous variant playlist (variant playlist 114). To illustrate, since "segment11.ts" was the last segment requested under the previous variant playlist, the client proxy picks up at the following segment, "segment2.ts," by issuing a segment request 122 (in the form of an HTTP GET request to the URI specified in the variant playlist 120 for "segment2.ts"), in response to which the media server 104 transmits the requested second segment 124 ("segment2,ts") with an encoding bitrate of 1 Mbps to the client device 108 as an HTTP response message containing transport stream packets comprising the second segment 124. The client proxy forwards the second segment 124 to the web browser, which decodes the segment (and decrypts it if received in encrypted form) and provides the resulting multimedia content for playback via the multimedia player. Under this approach, the client proxy is responsible for the adaptive bitrate selection, rather than the media player, and thus the client proxy can ensure that the client device 108 does not request different encoding versions of the same segment. This scheme is described in greater detail below with reference to FIGS. 6 and 7.

In some embodiments, encryption of segments of a streamed multimedia program may be employed by the media server 104 to deter unauthorized access to the multimedia content represented by the segments. The HLS standard specifies the use of Advanced Encryption Standard (AES) encryption as the encryption scheme, and further specifies that the playlist listing an encrypted segment also include a URI specifying the location at the media server of the cipher key used to decrypt the encrypted segment. A single cipher key may be used for all of the segments listed in a playlist or for a subset of N segments listed in a playlist (N>=1). In HLS, the cipher key identifier for a cipher key typically is presented in the playlist in the form of a cipher tag, #EXT-X-KEY, which identifies the encryption method employed and a URI of the cipher key at the media server. Accordingly, a client device, upon encountering a cipher tag in a playlist, can initiate a key exchange with the media server to obtain the cipher key. To illustrate, upon encountering a cipher tag for a cipher key 126 in the variant playlist 112, the client proxy of the client device 108 can issue a key request 128 to the media server 104 to obtain the cipher key 126, which then may be used to decrypt, for example, the subsequently-received segment 116.

In a conventional HLS implementation, the client device obtains the cipher key using a standard-type key exchange scheme (hereinafter, "standard key exchange") whereby the client device issues an HTTP request directed to the listed URI of the cipher key and the server responds to the HTTP request by sending the requested cipher key in plaintext via an HTTP response (HTTPS can be used to provide some level of security). As the cipher key is transmitted using HTTP or HTTPS, both of which are well-known and relatively unprotected transfer protocols, this unduly exposes the plaintext cipher key to interception by an unauthorized party. Accordingly, the client device 108 alternatively can employ a custom-type key exchange scheme (hereinafter "custom key exchange") whereby a non-standard key exchange is used to obtain the cipher key with some form of protection. The custom key exchange may use a non-standard protocol (e.g., an FTP protocol, a proprietary protocol, or some other protocol not based on HTTP). The custom key exchange also may use a non-standard protection technique, such as the use of symmetric encryption of the cipher key, one-time-pad encryption of the cipher key, encryption of the cipher key using predefined XOR logic, and the like.

Upon obtaining the cipher key using the custom key exchange, the client proxy then unprotects (e.g., decrypts or de-obfuscates) the cipher key, stores the cipher key locally, and provides the cipher key to the media player using the HLS standard key exchange scheme. In some embodiments, the client proxy achieves this protected transfer of the cipher key in a manner transparent to the streaming media client by replacing in the playlist the cipher key tag having a URI associated with the media server 104 with a cipher key tag that has a URI associated with the client proxy, thereby causing the streaming media client to seek the cipher directly from the client proxy using the standard HLS key exchange scheme, rather than from the media server 104. Moreover, the media server 104 can invoke this protected key exchange by using a cipher key URI in the playlist that includes a custom, or non-standard, URI scheme. This protected key exchange scheme is described in greater detail herein with reference to FIGS. 4 and 5. Trigger indicators other than a custom URI may instead be used in the playlist to direct the client proxy to perform the custom key exchange scheme instead of a standard key exchange scheme.

Figure 2:
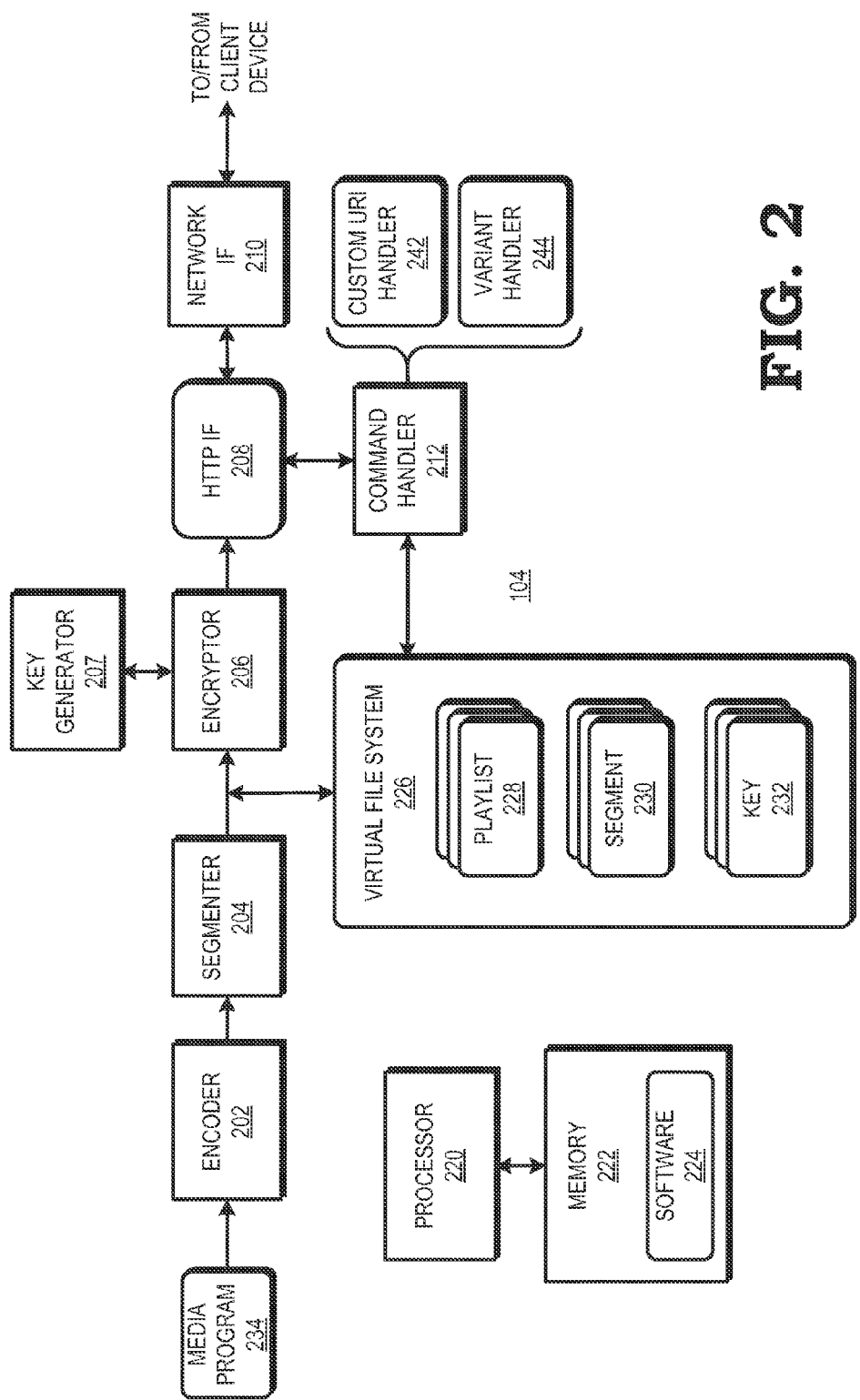
FIG. 2 is a block diagram illustrating an HLS-based media server in accordance with some embodiments.

FIG. 2 illustrates an example implementation of the media server 104 in accordance with some embodiments. In the depicted example, the media server 104 includes a multimedia encoder 202, a stream segmenter 204, a segment encryptor 206, a key generator 207, an HTTP interface 208, a network interface 210, and a command handler 212. Certain components of the media server 104 may be implemented exclusively in hardcoded or hardwired hardware, such as in an application specific integrated circuit (ASIC), whereas other components of the media server 104 may be implemented via one or more processors 220 and a memory 222 or other non-transitory computer readable medium that stores one or more software programs 224 that comprise executable instructions that, when executed, manipulate the one or more processors 220 to perform various functions described herein. For example, the multimedia encoder 202 may be implemented as a hardware-implemented MPEG-4 (H2.264 multimedia and AAC audio) encoder, whereas the stream segmenter 204, the segment encryptor 206, the key generator 207, the HTTP interface 208, and the command handler 212 are implemented as the one or more processors 220 executing one or more software programs 224. In such instances, the stream segmenter 204, segment encryptor 206, key generator 207, and command handler 212 may be implemented as application software (one example of software program 224), whereas the HTTP interface 208 is implemented as protocol stack software that is part of an operating system (OS) executed at the media server 104 (another example of the software program 224).

The processor 220 can include, for example, a microprocessor, a micro-controller, a digital signal processor, a microcomputer, a central processing unit, a field programmable gate array, a programmable logic device, a state machine, logic circuitry, analog circuitry, digital circuitry, or any other device that can be manipulated by the execution of software instructions stored in the memory 222. The memory 222 can include any of a variety of non-transitory computer readable media for storing the software program, such as a hard disc drive, solid state hard drive, read-only memory, random access memory, volatile memory, non-volatile memory, static memory, dynamic memory, flash memory, cache memory, and the like.

As noted above, the media server 104 operates to serve segmented multimedia streams to client devices through the implementation of HLS-based protocols. As the media server 104 may offer a number of multimedia programs for streaming to client devices, and considerable resources typically are needed to encode or transcode a multimedia program to comply with a particular bitrate or particular encoding scheme, the media server 104 typically does not initiate the encoding/transcoding and segmentation process until a media player of a client device submits a request for the multimedia program to be streamed to the client device. To this end, the media server 104 implements a virtual file system 226 to store one or more playlists 228 for each multimedia program available from the media server 104 and to act as a virtual repository for the (yet-to-be-generated) segments 230 and cipher keys 232 referenced by the playlists 228. To illustrate, the media server 104 may be able to provide different streamed versions of a given multimedia program, such as at a different bitrate, display resolution, or encoding scheme, and the media server 104 may maintain in the virtual file system 226 a separate variant playlist 228 for each available version. Likewise, the media server 104 may be able to encrypt segments of a multimedia program being streamed, in which case the cipher keys generated by the key generator 207 as part of this process may be virtually located in the virtual file system 226.

Each variant playlist 228 for a given multimedia program includes an indexed list of segments 230 for the corresponding multimedia program, with each entry of the list comprising a segment identifier including a URI identifying the relative or absolute location where the corresponding segment 230 can be found at the media server 104 in the virtual file system 226. However, because in some embodiments the segments 230 are generated on demand, the URIs for segments 230 referenced in the variant playlist 228 are "placeholders" in that the segment 230, once generated, subsequently will be associated with the indicated location. Likewise, variant playlists 228 having encrypted segments include one or more cipher key identifier, each including a URI identifying the relative or absolute location where a corresponding cipher key 232 can be found at the media server in the virtual file system 226. As with the segments 230, these cipher keys 232 may be generated on demand, and thus the URIs for the cipher keys 232 are "placeholders" for the cipher keys 232 once generated.

In operation, the streaming process for a multimedia program to a client device initiates when the client device requests a variant playlist 228 for an identified multimedia program 234. To obtain the variant playlist 228, the client device transmits a HTTP request for the variant playlist 228 to the media server 104 via the network 106 (FIG. 1) using, for example, a process like that described above with reference to Table 3. At the media server 104, the network interface 210 forwards the HTTP request data to the HTTP interface 208, which opens an HTTP output channel or HTTP session and forwards the relevant content from the HTTP request to the command handler 212. The command handler 212 coordinates the encoding and encryption processes for streaming a multimedia program to a client device. Accordingly, in response to the HTTP request for the variant playlist 228, the command handler 212 accesses the variant playlist 228 and forwards the variant playlist 228 to the HTTP interface 208, which transmits the variant playlist 228 for reception by the client device as a HTTP response over the opened HTTP output channel.

The client device the selects an initial segment 230 from the indexed list of segments 230 represented in the variant playlist 228 and transmits an HTTP request for the URI listed in association with the selected initial segment 230. Upon receipt, the HTTP interface 208 forwards the HTTP request to the command handler 212. In response to the segment request, the command handler 212 directs the multimedia encoder 202 to initiate encoding (or transcoding) of the multimedia program 234 at the appropriate playback location in accordance with the bitrate or other encoding parameters associated with the variant playlist 228. The resulting stream of encoded MPEG2 transport stream packets is then segmented by the stream segmenter 204 into a sequence of multimedia, or transport stream, segments 230, including the requested initial segment 230.

In some instances, the media server 104 may employ an encryption scheme to secure the multimedia content from unauthorized access, in which case the segments 230 may be encrypted by the segment encryptor 206 using one or more cipher keys 232 generated by the key generator 207, using for example, an asymmetric or symmetric key generation process as commonly used for the AES encryption scheme. The resulting cipher keys 232 may be cached or more permanently stored in, for example, the virtual file system 226. The command handler 212 then coordinates the provision of the requested initial segment 230 to the HTTP interface 208, whereupon the initial segment 230 is transmitted by the HTTP interface 208 over the opened HTTP output channel for reception by the client device via the network interface 210 and the network 106. The command handler 212 may employ a custom URI handler 242 and a variant playlist handler 244 in furtherance of these operations, as described below.

Figure 3:
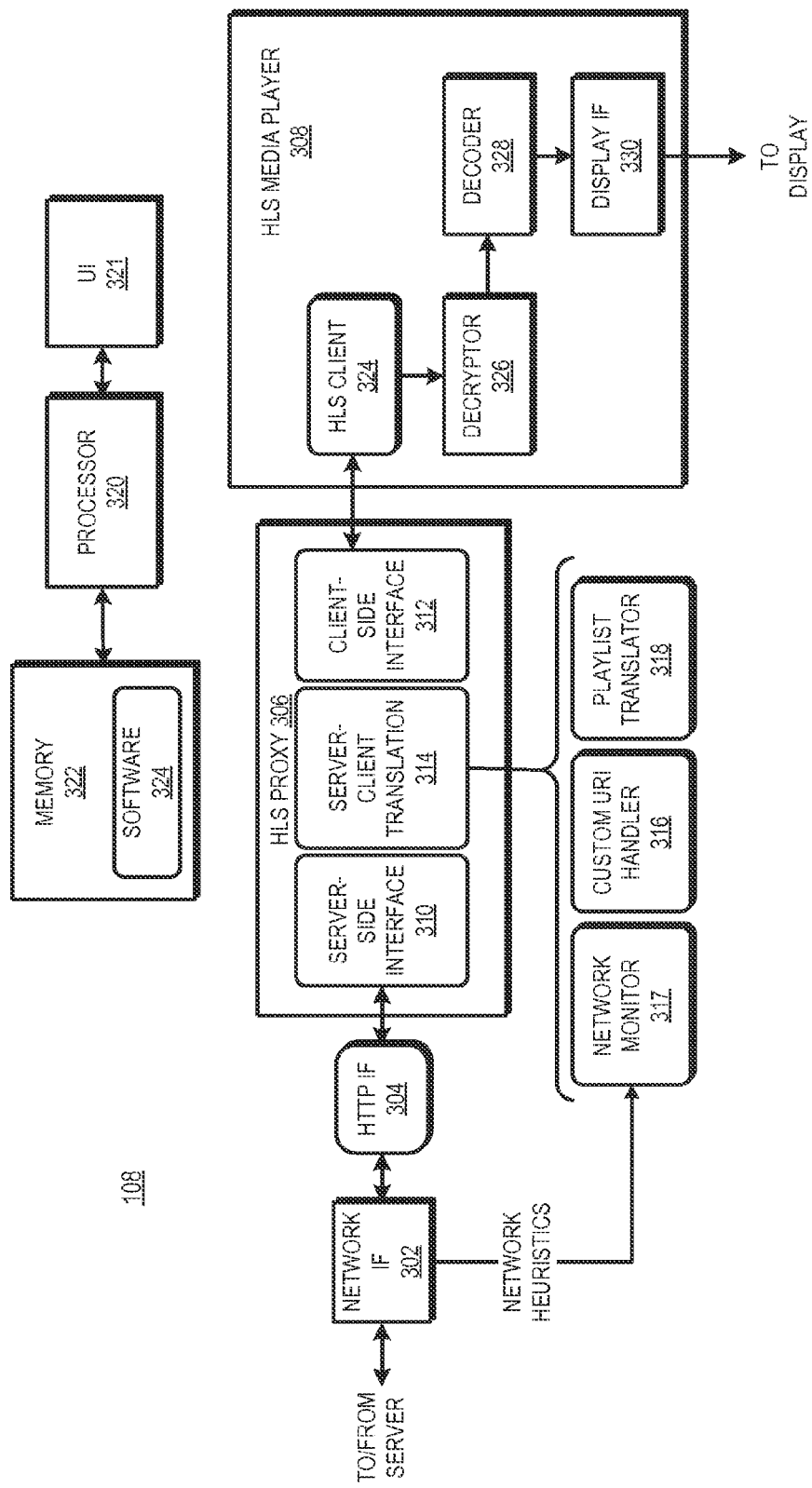
FIG. 3 is a block diagram illustrating an HLS-based client device in accordance with some embodiments.

FIG. 3 illustrates an example implementation of the client device 108 in accordance with some embodiments. In the depicted example, the client device 108 includes a network interface 302, a HTTP interface 304, a HLS-based client proxy 306 (referred to herein as "HLS proxy 306"), and a HLS-based media player 308 (referred to herein as "HLS media player 308"). Certain components of the client device 108 may be implemented exclusively in hardcoded or hardwired hardware, whereas other components of the client device 108 may be implemented via one or more processors 320, user interface (UI) devices 321 (e.g., a keypad, mouse, touchscreen, and the like), and a memory 322 or other non-transitory computer readable medium that stores one or more software programs 324 that comprise executable instructions that, when executed, manipulate the one or more processors 320 to perform various functions described herein. The processor 320 can include, for example, a microprocessor, a micro-controller, a digital signal processor, a microcomputer, a central processing unit, a field programmable gate array, a programmable logic device, astute machine, logic circuitry, analog circuitry, digital circuitry, or any other device that can be manipulated by the execution of software instructions stored in the memory 322. The memory 322 can include any of a variety of non-transitory computer readable media for storing the software program, such as a hard disc drive, solid state hard drive, read-only memory, random access memory, volatile memory, non-volatile memory, static memory, dynamic memory, flash memory, cache memory, and the like.

In the depicted example, the proxy 306 includes a server-side interface 310, a client-side interface 312, and a server-client translation module 314. The server-side interface 310 operates so as to emulate an HLS client with respect to the media server 104 and the client-side interface 312 operates so as to emulate an HLS server with respect to the HLS media player 308. The server-client translation module 314 operates as a conduit between these two interfaces, and includes a network monitor 317, a custom URI handler 316, and a playlist translator 318 (described below) in support of this function, The HLS media player 308 includes an HLS client 324, a segment decryptor 326, a segment decoder 328, and a display interface 330 coupled to a display device (not shown). Various operations of the client device 108 as illustrated in FIG. 3 are described in detail below with reference to the example processes of FIGS. 4-7.

Figure 4:
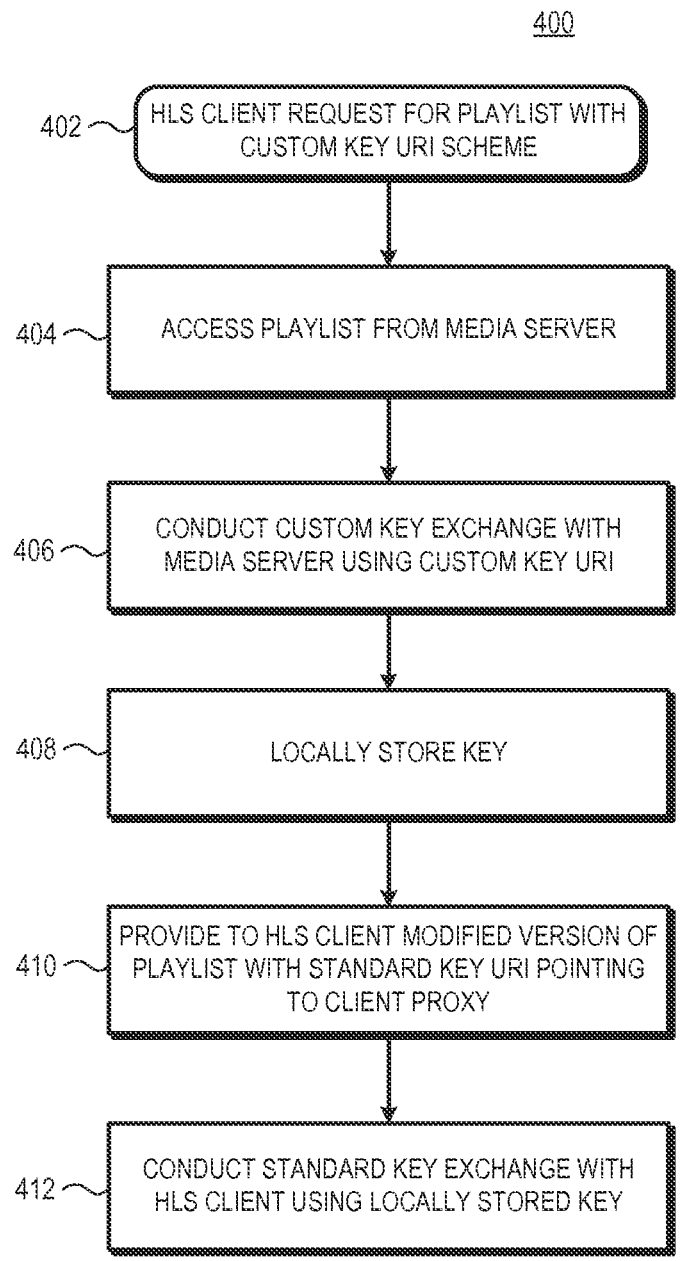
FIG. 4 is a flow diagram illustrating a method for conducting a custom cipher key exchange using a HLS client proxy in accordance with some embodiments.
Figure 5:
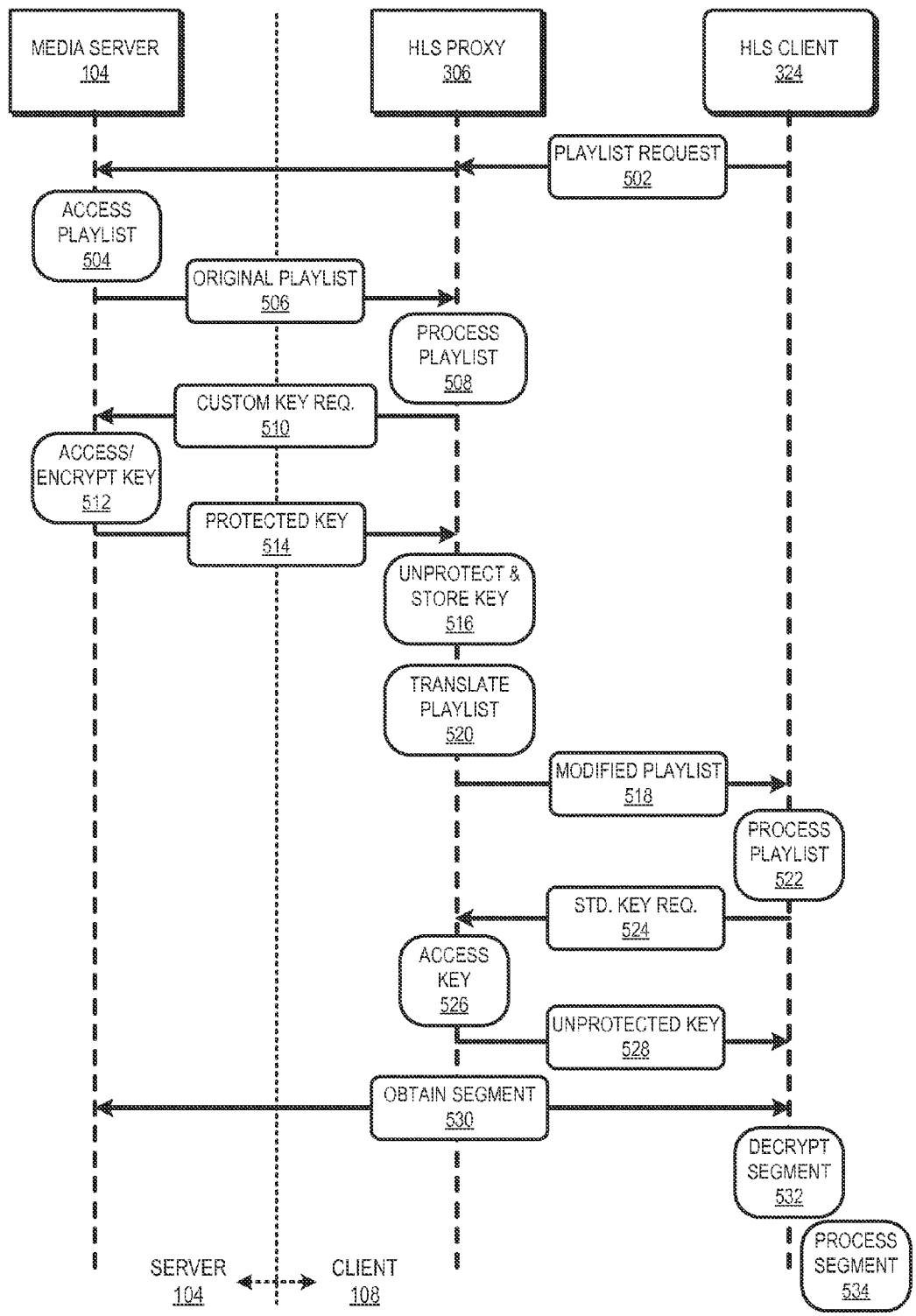
FIG. 5 is a diagram illustrating an example implementation of the method of FIG. 4 in accordance with some embodiments.

FIGS. 4 and 5 together illustrate an example method 400 for a proxy-based custom key exchange between a client device and a media server in accordance with some embodiments. For ease of illustration, the method 400 is described in the example context of the client device 108 of FIG. 3 and the media server 104 of FIG. 2, and using a flow illustrated by FIG. 5 as an illustration of the method 400. The method 400 initiates at block 402 with the issuance by the HLS client 324 of a playlist request 502 (FIG. 5) for a playlist associated with a multimedia program selected by an end user via the UI device 321. At block 402, the HLS proxy 306 receives the playlist request 502 and, in response, accesses the identified playlist from the media server 104. This access process can include, for example, the server-side interface 310 of the HLS proxy 306 forwarding the playlist request 502 as an HTTP request using the URI for the playlist identified from the playlist request 502. In response to the HTTP request, the command handler 212 of the media server 104 accesses the requested playlist from the virtual file system 226 (access operation 504) and then forwards the requested playlist ("original playlist 506", FIG. 5) to the HLS proxy 306 as an HTTP response message.

As noted, HLS playlists, such as the original playlist 506, may use a cipher key identifier comprising a cipher key tag and cipher key URI to point an HLS client to the location of the cipher key needed to decrypt certain segments listed in the HLS However, in order to invoke the protected key exchange described herein, in some embodiments the custom URI handler 242 (FIG. 2) of the command handler 212 (FIG. 2) inserts a custom key exchange trigger in the form of, for example, a custom URI for the cipher key in the cipher key identifier in place of a standard URI as specified by the HLS standard. The HLS standard specifies that a standard cipher key identifier in the playlist represent a tag and a URI in the form of:
EXT-X-KEY:METHOD=<method>,
URI="<standard_scheme>://server:port/path?other_id"
where #EXT-X-KEY is the cipher key tag, <method> may be either "NONE" (signifying no encryption) or "AES-128" (signifying AES encryption), <standard_scheme> represents a well-known transfer protocol scheme recognized by HLS (such as "http" for HTTP, "ftp" for File Transfer Protocol, etc.), "server" is the name or other path identifier (e.g., IP address) of the media server, "port" is the port number to use for access, "path" is the directory path at the media server, and "other_id" can comprise various parameters. To permit a cipher key that is available via a protected key exchange scheme to be readily recognized as such, in one embodiment, a custom scheme is used in place of the standard scheme in the identified URI that follows the cipher key tag, where the custom scheme can be anything other than the well-known schemes typically used in URIs. Thus, a custom key identifier that invokes a protected key exchange can take the form of:
EXT-X-KEY:METHOD=<method>,
URI="<custom_scheme>://server:port/path?other_id"
where <custom_scheme> is not a well-known transfer protocol scheme, and thus identifies the URI as a custom URI that triggers the protected key exchange process. For purposes of the following example, a scheme identified as "morega" is used as the custom scheme identifier for <custom_scheme>.

In this example, the original playlist 506 includes a cipher key identifier that the media server 104 intends to be accessed only through the protected key exchange process and, as such, the custom URI handler 242 (FIG. 2) inserted a cipher key identifier with a custom URI into the original playlist 506 before it was served to the client device 108. Table 4 below illustrates a simple example of the original playlist 506 with this custom cipher key identifier.

TABLE 4

Example Original Playlist 506

| | |
|---|---|
| (1) | #EXTM3U |
| (2) | #EXT-X-VERSION:3 |
| (3) | #EXT-X-TARGETDURATION:10 |
| (4) | #EXT-X-KEY:METHOD = AES-128, URI = "morega://server:8081/key?r=52" |
| (5) | #EXTINF:15.0, http://server:8081/segment53.ts |
| (6) | #EXT-X-ENDLIST |

The presence of the scheme "morega" in the URI listed in the cipher key identifier at line (4) signifies that the corresponding cipher key is to be accessed via a custom key exchange process. Accordingly, upon receipt of the original playlist 506, the server client translation module 314 processes the original playlist 506 (process playlist action 508, FIG. 5) to determine whether a cipher key identifier is present, and if so, whether it is a cipher key identifier with a standard URI or a custom URI (or other custom key exchange trigger.). In this example, the URI for the cipher key identifier has the custom scheme "morega", and thus is identified as a cipher key identifier with a custom URI. This detection invokes the custom URI handler 316 of the HLS proxy 306 to conduct a protected key exchange with the media server 104 at block 406 of method 400.

In some embodiments, this custom key exchange includes transmitting a protected key request 510 (FIG. 5) from the HLS proxy 306 to the media server 104. The protected key request 510 can include, for example, an HTTP or HTTPS request directed to the URI identified in the cipher key identifier (e.g., "//server:8081/key"). In response, at the media server 104, the custom URI handler 242 of the command handler 212 accesses the requested cipher key and protects it in accordance with some predetermined logic or a set of one or more predetermined keys. To illustrate, the custom URI handler 242 may provide the requested cipher key and pre-arranged key associated with the client device 108 (e.g., included in the custom key request 510) to the segment encryptor 206, which encrypts the cipher key using 128-bit AES encryption. As another example, the cipher key may be protected using an obfuscation technique like using pre-defined XOR logic. Further, in some embodiments, the cipher key may already have been stored in protected form before the request was received. As part of the access process, the HLS proxy 306 at the client device 108 and the media server 104 may engage in any of a variety of authentication processes to verify the identity of the client device 108. With the requested cipher key encrypted or otherwise protected, the custom URI handler 242 provides the resulting protected cipher key 514 (FIG. 5) for transmission to the client device as, for example, a HTTP or HTTPS reply message. In other embodiments, a different standard transfer protocol (e.g., FTP) or a proprietary transfer protocol may be used to transfer either or both of the key request or the requested key.

Upon receipt of the protected cipher key 514, the custom URI handler 316 of the HLS proxy 306 decrypts or otherwise unprotects the protected cipher key 514 to obtain the cipher key in plaintext form (unprotect and store action 516, FIG. 5). This process can include, for example, decrypting the protected cipher key 514 using a pre-stored key of the client device 108 that corresponds to the key used by the media server 104 to encrypt the protected cipher key 514, by using XOR logic or other predetermined logic that is the inverse of the encoding logic used by the media server 104, and the like. With the cipher key obtained in plaintext form, at block 408 the HLS proxy 306 stores the unprotected cipher key in a local storage location. The local storage location can include, for example, a register, cache, buffer, or other storage inaccessible to an operating system or other software executing at the client device 108. Alternatively, the HLS proxy 306 refrains from unencrypting or unprotecting the protected cipher key 514 until it is requested by the HLS client 324 as described below.

With the cipher key so obtained, the HLS proxy 306 is ready to provide the cipher key to the HLS client 324 of the HLS media player 308. However, in some embodiments, it is intended to have the custom key exchange conducted transparently to the HLS media player 308 such that the HLS client 324 of the HLS media player 308 can operate to access cipher keys in accordance with standard HLS key exchange schemes. As part of this transparent operation, the HLS proxy 306 steps in to act as the media server when the HLS client 324 requests the cipher key in order to decrypt encrypted segments. To this end, at block 410 the HLS proxy 306 provides the HLS client 324 with a modified version (modified playlist 518, FIG. 5) of the original playlist 506 requested by the HLS client 324, whereby the modified playlist 518 has as the URI of the cipher key a URI that points to the FIB proxy 306 and the local storage location at which the plaintext cipher key has been stored. Thus, as part of this process, the playlist translator 318 copies the original playlist 506 and translates the original cipher key URI (pointing to the media server 104) to a modified cipher key URI that points to the local storage location. To illustrate, the original cipher key URI of:

URI="morega://server:8081/key?r=52"
found in the cipher key identifier at line (4) of Table 2 can be translated to:
URI="http://localhost:8080/key?r=52"
as such the original playlist 510 as represented by Table 4 above is translated (translation action 520, FIG. 5) into the modified playlist 518 (FIG. 5) shown below in Table 5:

TABLE 5

Example Modified Playlist 518

| (1) | #EXTM3U |
| (2) | #EXT-X-VERSION:3 |
| (3) | #EXT-X-TARGETDURATION:10 |
| (4) | #EXT-X-KEY:METHOD = AES-128, URI = "http://localhost:8080/key?r=52" |
| (5) | #EXTINF:15.0, http://server:8081/segment53.ts |
| (6) | #EXT-X-ENDLIST |

As such, the modified playlist 518 appears to the HLS client 324 as a standard HLS playlist with a standard cipher key identifier having a standard cipher key URI.

The HLS client 324 processes the modified playlist 518 (process action 522, FIG. 5). Upon encountering the cipher key identifier present in the modified playlist 518, the HLS client 324 initiates a standard key exchange process at block 412 of method 400. However, rather than conducting the key exchange with a media server, the HLS client 324 instead conducts the key exchange with the HLS proxy 306 (emulating a server via the client-side interface 312) due to the fact that the cipher key URI present in the modified playlist 518 points to the HLS proxy 306. This standard key exchange process can include, for example, the HLS client 324 issuing a standard key request 524 (FIG. 5) as an HTTP or HTTPS request directed to the HLS proxy 306 due to the URI "//localhost:8080" location. In response to this key request, the custom URI handler 316 of the HLS proxy 306 accesses the unprotected cipher key ("unprotected cipher key 528", FIG. 5) from its local storage location and transmitting the unprotected cipher key 528 to the HLS client 324 as a HTTP or HTTP reply message.

With the unprotected cipher key 528 at hand, the HLS client 324 can access one or more encrypted segments listed in the modified playlist 518 from the media server 104 (segment access action 530, FIG. 5), provide the encrypted segment to the segment decryptor 326 for decryption using the unprotected cipher key 528 (decryption action 532, FIG. 5), and then process the decrypted segment for playback via the display interface 330 (process action 534, FIG. 5).

Figure 6:
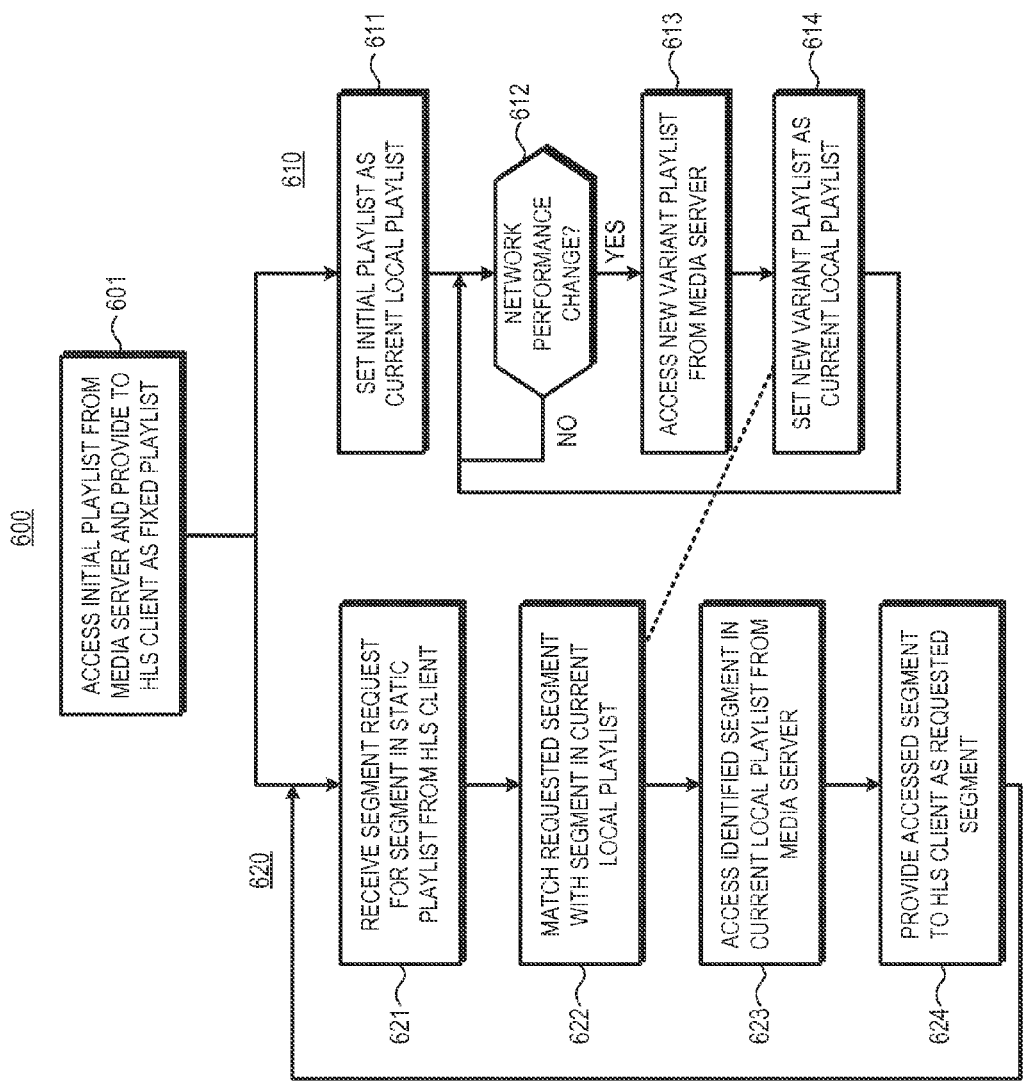
FIG. 6 is a flow diagram illustrating a method for adaptive bitrate selection using a HLS client proxy in accordance with some embodiments.
Figure 7:
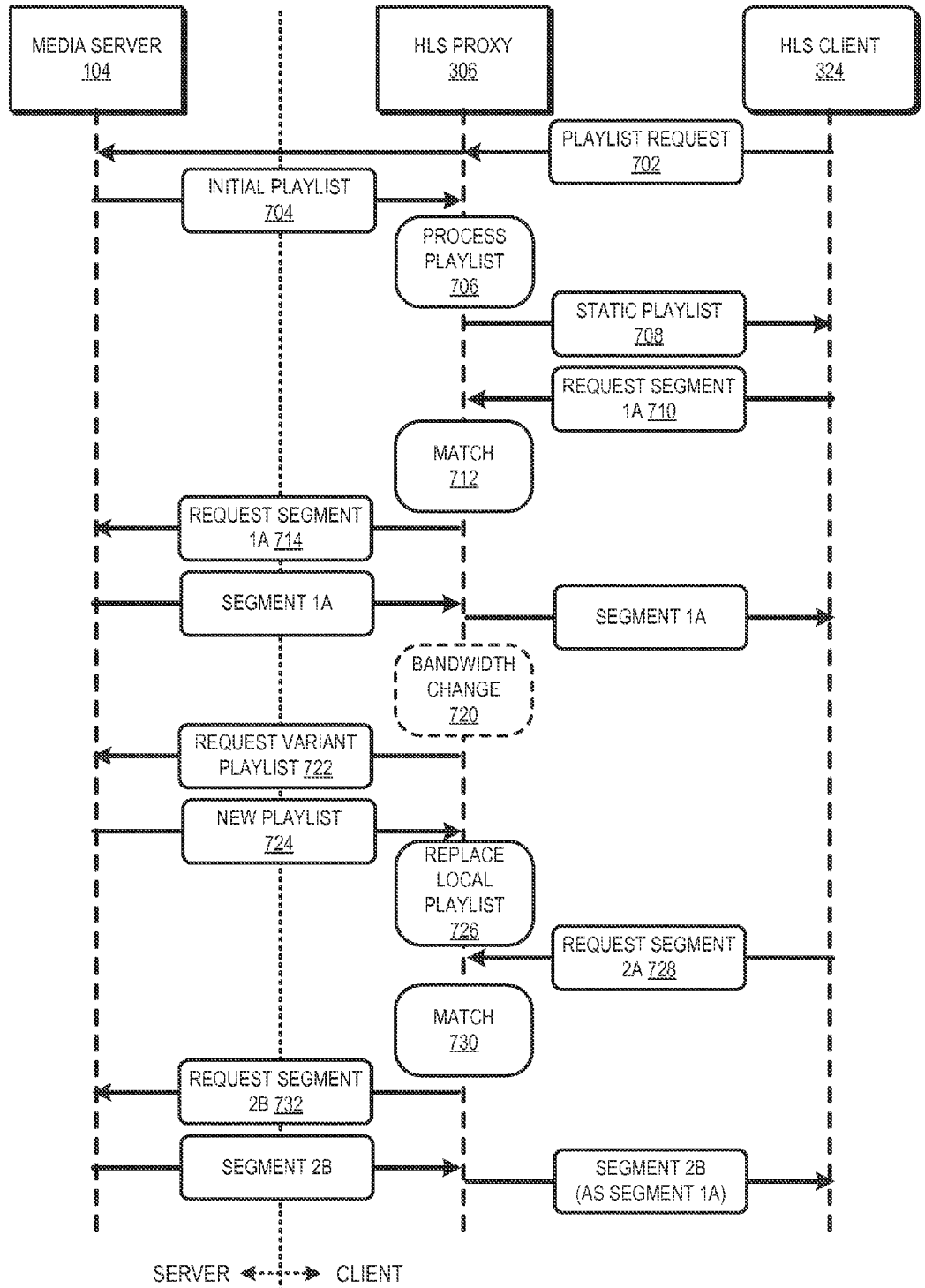
FIG. 7 is a flow illustrating an example implementation of the method of FIG. 6 in accordance with some embodiments.

FIGS. 6 and 7 together illustrate an example method 600 for proxy-based adaptive bitrate segment selection in accordance with some embodiments. For ease of illustration, the method 600 is described in the example context of the client device 108 of FIG. 3 and the media server 104 of FIG. 2. The method 600 includes two sub-processes that operate in parallel: sub-process 610 and sub-process 620.

The method 600 initiates in a context whereby the HLS client 324 has obtained from the media server 104, via the HLS proxy 306, a master playlist and selected from this master playlist an initial variant playlist for a multimedia program selected by an end user via the UI device 321. At block 601, the playlist translator 318 of the HLS proxy 306 uses this initial variant playlist to generate a static playlist, which is provided to the HLS client 324 as the only playlist to be used by the HLS client 324 for streaming the selected multimedia program.

The sub-process 610 initiates at block 611, whereupon the playlist translator 318 stores the initial variant playlist as the current version of the local variant playlist to be used by the HLS proxy 306 in requesting segments as described below. Meanwhile, at block 612 the network monitor 317 of the HLS proxy 306 continuously monitors the network interface 302 of the client device 108 to determine the current conditions of the network link between the media server 104 and the client device 108. The monitored network heuristics can include, for example, available bandwidth, transfer rate of segment data, jitter, etc. In the event that the monitored network heuristics indicate that the performance of the link has substantially changed, at block 613 the network monitor 317 triggers the playlist translator 318 to access from the media server 104 a new variant playlist that is more suited to the changed network performance and, at block 614, the playlist translator 318 replaces the previous version of the local variant playlist with the new variant playlist, and thus setting the new variant playlist as the current version of the local variant playlist. To illustrate, if the available bandwidth of the network link has increased from 1 Mbps to 4 Mbps, the playlist translator 318 can access from the media server 104 a new variant playlist associated with an encoding of the multimedia program at a bit rate of 4 Mbps and then use his new variant playlist as the local variant playlist and discard the previous version that was associated with an encoding of 1 Mbps.

In parallel with sub-process 610, sub-process 620 is performed to provide transparent adaptive bitrate selection using the current local variant playlist that is updated by the HLS proxy 306 as network conditions change. To this end, the sub-process 620 is initiated at block 621, whereupon the HLS client 324, using the static playlist, issues a segment request for a selected segment. The client-side interface 312 of the HLS proxy 306 intercepts this segment request and forwards it to the playlist translator 318. At block 622, the playlist translator 318 matches the requested segment with a corresponding segment listing in the current local variant playlist maintained by the HLS proxy 306. In one embodiment, this matching process can be based on a comparison of the URI of the requested segment to the URIs of the segments listed in the current local variant playlist. To illustrate, if the segment request from the HLS client 324 identifies the segment as having a file name "segment4.ts", the playlist translator 318 searches the URIs of the listed segments in the current local variant playlist for a matching filename. Once matched, at block 633, the server-side interface 310 of the HLS proxy issues a segment request to obtain the segment identified from the current local variant playlist. This segment request can include, for example, an HTTP request directed to the URI associated with the segment in the current local variant playlist. At block 624, the media server 104 responds to the segment request by accessing the requested segment and then transmitting the requested segment to the HLS proxy 306 via, for example, a HTTP reply message. The client-side interface 312 then provides this segment to the HLS client 324 as the segment requested by the HLS client 324.

FIG. 7 depicts an example sequence utilizing the proxy-based adaptive bitrate segment selection method of HG. 6 in accordance with some embodiments. The HLS client 324 issues a playlist request 702 for a selected variant playlist for a multimedia program to be displayed by the HLS multimedia player 308. In this example, this initial variant playlist 704 represents a 2 Mbps encoding of the listed segments. The HLS proxy 306 accesses the initial variant playlist 704 and processes it (action 706) to generate a static playlist 708 to be used by the HLS client 324 for all segment requests for the multimedia program. It also sets the initial variant playlist 704 as the current version of its local variant playlist.

Subsequent to receiving the static playlist 708, the HLS client 324 initiates a segment request 710 for the first segment listed in the static playlist 708, identified herein as "segment 1A". In response, the HLS proxy 306 matches the requested segment 1A to a corresponding segment for the same multimedia content as listed in its current local variant playlist. In this example, the current local variant playlist and the static playlist 708 are the same version at this point. As such, the HLS proxy 306 issues a segment request 714 to the media server 104 to access the segment 1A (also identified in FIG. 7 as "segment 716") from the media server 104. Upon receipt, the HLS proxy 306 provides the received segment as the requested segment 718.

At a later point (action 720), the network monitor 317 (FIG. 3) detects an increase in network performance, and thus the HLS proxy 306 sends a playlist request 722 to the media server 104 to obtain a new variant playlist that represents a 4 Mbps encoding that is compatible with the increased network performance. The media server 104 responds with the requested new variant playlist 744, which the HLS proxy 306 installs as the current version of the local variant playlist (action 726). With this update/replacement of the local variant playlist used by the HLS proxy 306 in place, when the HLS client 324 issues a segment request 728 for a segment 2A listed in the static playlist 708, the HLS proxy 306 identifies the 2 Mbps-encoded segment 2A and a 4 Mbps-encoded segment 2B in the now-current local variant playlist as being different versions of the same segment (that is, different encodings of the same portion of multimedia content). With segment 2B so matched to the requested segment 2A, the HLS proxy 306 accesses the segment 2B from the media server 104 via a segment request 732 and a media server response 734. Upon receipt of the segment 2B from the media server 104, the HLS proxy 306 forwards the segment 2B to the HLS client 324 as the requested segment 2A. As the HLS client 324 is unaware of the behind-the-scenes switching of local variant playlists at the HLS proxy 306, the HLS client 324 perceives the received segment 2B as the requested segment 2A and processes the segment for playback accordingly.

Under this approach, the HLS client 324 has access to only one variant playlist for a multimedia program, regardless of changes in the network performance. As such, the HLS client 324 is prevented from flushing its buffer and requesting a different encoding version of a segment that it had already requested from the media server 104. Instead, the HLS proxy 306 swaps out its local variant playlist based on changing network conditions, and thus can adapt the bit rate of the requested segments to the current network conditions based on the translation of the segments requested by the HLS client 324 from the bitrate-independent static playlist to the bitrate-specific version of the local variant playlist currently maintained by the HLS proxy 306.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to elearo-optical technology, is defined as connected, although not necessarily directly, and not necessarily mechanically.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a client device, a method comprising:
receiving, at a client proxy of the client device, a first version of a playlist from a media server, the first version of the playlist including a first identifier for a cipher key to be used to decrypt at least one segment listed in the playlist;
obtaining the cipher key at the client proxy by conducting a first key exchange between the client proxy and the media server using the first identifier, the first key exchange comprising a transfer of a protected version of the cipher key;
storing the cipher key at a local storage location at the client device;
providing a second version of the playlist from the client proxy to a media player of the client device, the second version of the playlist including a second identifier for the cipher key, the second identifier identifying the local storage location at the client device;
receiving, at the client proxy, a key request from the media player, the key request based on the second identifier; and
accessing the cipher key from the local storage location and providing the cipher key from the client proxy by conducting a second key exchange between the client proxy and the media player, the second key exchange comprising a transfer of an unprotected version of the cipher key.

2. In a client device, a method comprising:
receiving, at a client proxy of the client device, a first version of a playlist from a media server, the first version of the playlist including a first identifier for a cipher key to be used to decrypt at least one segment listed in the playlist;
obtaining the cipher key at the client proxy by conducting a first key exchange between the client proxy and the media server using the first identifier, the first key exchange comprising a transfer of the cipher key not based on a Hypertext Transfer Protocol;
storing the cipher key at a local storage location at the client device;
providing a second version of the playlist from the client proxy to a media player of the client device, the second version of the playlist including a second identifier for the cipher key, the second identifier identifying the local storage location at the client device;
receiving, at the client proxy, a key request from the media player, the key request based on the second identifier; and
accessing the cipher key from the local storage location and providing the cipher key from the client proxy by conducting a second key exchange between the client proxy and the media player, the second key exchange comprising a transfer of the cipher key based on a Hypertext Transfer Protocol.

3. In a client device, a method comprising:
receiving, at a client proxy of the client device, a first version of a playlist from a media server, the first version of the playlist including a first identifier for a cipher key to be used to decrypt at least one segment listed in the playlist, the first identifier comprising a first uniform resource indicator (URI) with a first scheme type, the first scheme type comprising a custom scheme type;
obtaining the cipher key at the client proxy by conducting a first key exchange between the client proxy and the media server using the first identifier;
storing the cipher key at a local storage location at the client device;
providing a second version of the playlist from the client proxy to a media player of the client device, the second version of the playlist including a second identifier for the cipher key, the second identifier identifying the local storage location at the client device and comprising a second URI with a second scheme type different than the first scheme type, the second scheme type comprising a standard scheme type;
receiving, at the client proxy, a key request from the media player, the key request based on the second identifier; and
accessing the cipher key from the local storage location and providing the cipher key from the client proxy by conducting a second key exchange between the client proxy and the media player; and
wherein conducting the first key exchange comprises conducting the first key exchange responsive to the first URI having the custom scheme type.

4. A client device comprising:
a network interface coupleable to a media server via a network;
a media player to playback multimedia content based on a stream of segments received via the network interface; and
a client proxy, wherein the client proxy is to:

receive a first version of a playlist from the media server, the first version of the playlist including a first identifier of a cipher key to be used to decrypt at least one segment listed in the playlist;

conduct a first key exchange with the media server using the first identifier to obtain the cipher key, the first key exchange being a key exchange of a first type, wherein the first type of key exchange comprises a transfer of a protected version of the cipher key;

store the cipher key at a local storage location at the client device;

provide a second version of the playlist to the media player, the second version of the playlist including a second identifier of the cipher key, the second identifier identifying the local storage location at the client device;

receive a key request from the media player, the key request based on the second identifier; and access the cipher key from the local storage location and provide the cipher key to the media player by conducting a second key exchange with the media player, wherein the second type of key exchange comprises a transfer of an unprotected version of the cipher key.

5. The client device of claim 4, wherein the client proxy is to conduct the first key exchange with the media server using the first identifier by:

receiving the cipher key in a protected form from the media server; and unprotecting the cipher key in accordance with a decryption scheme configured prior to conducting the first key exchange.

6. The client device of claim 5, wherein the decryption scheme comprises decrypting the cipher key using pre-configured exclusive-or (XOR) logic of the client device.

7. A client device comprising:

a network interface coupleable to a media server via a network;

a media player to playback multimedia content based on a stream of segments received via the network interface; and a client proxy, wherein the client proxy is to:

receive a first version of a playlist from the media server, the first version of the playlist including a first identifier of a cipher key to be used to decrypt at least one segment listed in the playlist, wherein the first identifier comprises a first uniform resource identifier (URI) with a first scheme type, the first scheme type comprising a custom scheme type;

conduct a first key exchange with the media server using the first identifier to obtain the cipher key, the first key exchange being a key exchange of a first type;

store the cipher key at a local storage location at the client device;

provide a second version of the playlist to the media player, the second version of the playlist including a second identifier of the cipher key, the second identifier identifying the local storage location at the client device and comprising a second URI with a second scheme type different than the first scheme type, the second scheme type comprising a standard scheme type;

receive a key request from the media player, the key request based on the second identifier; and access the cipher key from the local storage location and provide the cipher key to the media player by conducting a second key exchange with the media player, he second key exchange being a key exchange of a second type different than the first type; and wherein the client proxy is configured to conduct the first key exchange responsive to the first URI having the custom scheme type.

8. A client device comprising:

a network interface coupleable to a media server via a network;

a media player to playback multimedia content based on a stream of segments received via the network interface; and a client proxy, wherein the client proxy is to:

receive a first version of a playlist from the media server, the first version of the playlist including a first identifier of a cipher key to be used to decrypt at least one segment listed in the playlist;

conduct a first key exchange with the media server using the first identifier to obtain the cipher key, the first key exchange being a key exchange of a first type, wherein the first key exchange comprises a transfer of the cipher key not based on a Hypertext Transfer Protocol;

store the cipher key at a local storage location at the client device;

provide a second version of the playlist to the media player, the second version of the playlist including a second identifier of the cipher key, the second identifier identifying the local storage location at the client device;

receive a key request from the media player, the key request based on the second identifier; and access the cipher key from the local storage location and provide the cipher key to the media player by conducting a second key exchange with the media player, wherein the second key exchange comprises a transfer of the cipher key based on a Hypertext Transfer Protocol.

* * * * *